R. B. DISBROW.
COMBINED CHURN AND BUTTER WORKER.
APPLICATION FILED OCT. 30, 1920.

1,390,343.

Patented Sept. 13, 1921.
2 SHEETS—SHEET 1.

Inventor
R. B. Disbrow
By his Attorney
Harry D. Kilgore

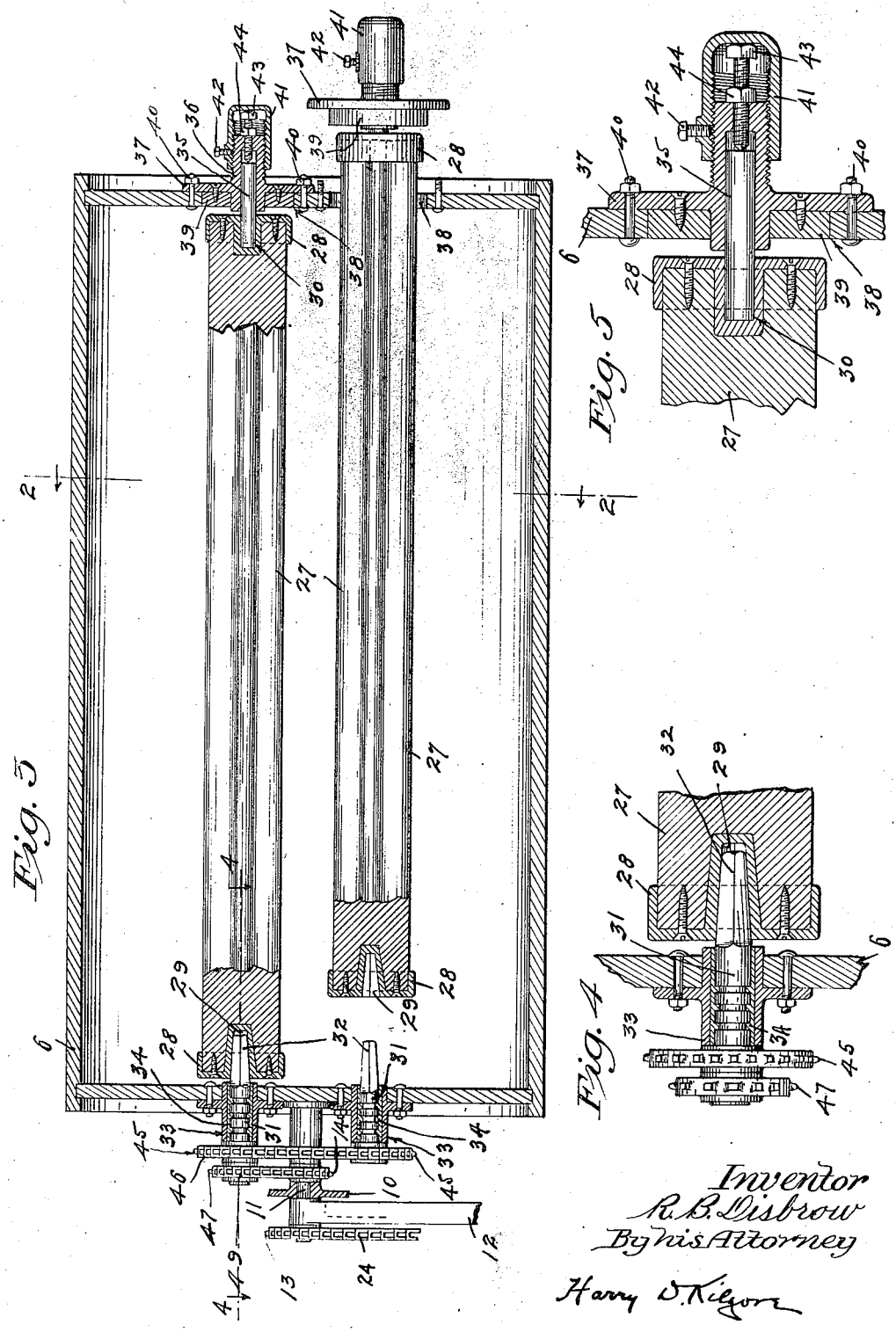

UNITED STATES PATENT OFFICE.

REUBEN B. DISBROW, OF OWATONNA, MINNESOTA.

COMBINED CHURN AND BUTTER-WORKER.

1,390,343.

Specification of Letters Patent. Patented Sept. 13, 1921.

Application filed October 30, 1920. Serial No. 420,662.

*To all whom it may concern:*

Be it known that I, REUBEN B. DISBROW, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My present invention relates, particularly, to combined churns and butter workers, and is directed to the provision of improved roller supporting and driving means.

Generally stated, the invention consists of the novel construction and combinations of parts hereinafter described and defined in the claims.

In combined churns and butter workers, the working rollers are grouped in the vicinity of the axis of the drum and are journaled to the heads of the drum. It is important that these rollers be readily removable from the drum for the purpose of cleaning or for other purposes; and, as a feature of the present invention, I provide novel means for accomplishing this result.

It is also important that the rollers be readily connectible and disconnectible from their driving shafts or trunnions, which latter are journaled in and extended through one head of the drum; and, as another feature of my invention, I provide means for accomplishing this further result.

In accomplishing the results above generally indicated, I provide certain novel and important features or details of construction, all as will hereinafter appear.

The several features of my invention may be incorporated in combined churns and butter workers of various different types, but, in the drawings, I have shown the same as incorporated in a combined churn and butter worker of the type disclosed and claimed in my prior Patent # 1,322,675, of date November 25, 1919.

In the said drawings, which illustrate the invention, like characters indicate like parts throughout the several views.

Referring to the drawings:

Fig. 3 is a vertical section taken axially through the machine, some parts being broken away and one of the rollers being shown as partly withdrawn from the drum;

Fig. 4 is a fragmentary section taken approximately on the line 4—4 of Fig. 3, some parts being shown in full; and Fig. 5 is a fragmentary section taken on the line 5—5 of Fig. 3.

Figure 2:
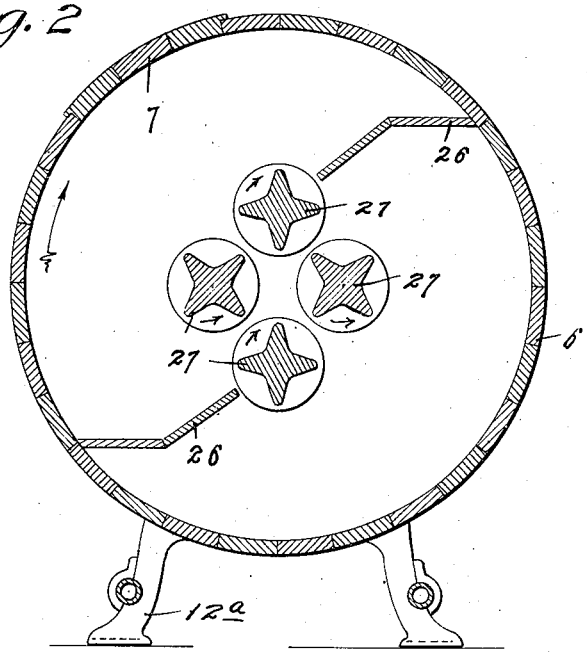
Fig. 2 is a transverse section taken on the line 2—2 of Fig. 3.

The drum 6, which is of the usual or any suitable construction, is provided with a suitable, normally closed door 7, and is mounted to rotate on a horizontal axis in frame pedestals.

One head of the drum is provided with a large annular sprocket 9 (shown only in Fig. 1) having radial spokes 10 that connect the same to a hub that is journaled to one of the frame pedestals 12. Just outward of said pedestals 12, the axial shaft 11 is provided with a sprocket 13, and just inward of the spokes 10, said shaft is provided with a sprocket 14.

In the driving mechanism illustrated, power will be transmitted to the machine by a belt, not shown, but which will run over a pulley 15 secured to a shaft 16 that is journaled in the base structure 12ª of the frame pedestal 12 in which the shaft 11 is journaled.

A sprocket chain 17 runs over the large sprocket 9 and over a small sprocket 18 on a countershaft 19 that is journaled on the pedestal base 12ª and is provided also with a somewhat larger sprocket 20 and with a much larger sprocket 21. The drum-driving mechanism here illustrated is of well known construction and it is sufficient, for the purposes of this case, to state that the drum will be driven in the direction of the arrow marked on Fig. 2, respectively, for low and high speeds, through sprocket chains 22 and 23 that run over the sprockets 21 and 20, respectively, and are driven from laterally spaced sprockets 21' on the pulley-equipped driving shaft 16 under control of clutch mechanism, not illustrated. A roller-driving sprocket chain 24 runs over the sprocket 13 on the axial drum shaft 11 and over another sprocket, of the same size as the sprockets 21', which is also secured to the shaft 16.

Located within the drum, in diametrically opposite arrangement, are two butter-lifting flights or shelves 26 that deliver the butter on the rising side of the drum to the butter-working rollers 27. These rollers 27 are preferably corrugated or formed with radial blades and they are preferably of the arrangement illustrated in my prior patent, there being four such rollers grouped in two pairs spaced around the axis of the drum, one diametrically opposite pair of rollers being more closely spaced than the other (see particularly Fig. 2). This last noted feature is an improvement on the arrangement illustrated in the drawings of my prior patent and is for a purpose which will presently appear. The rollers, at their ends, are provided with metallic caps 28. The caps that are at the geared or driven end of the drum are formed with angular tapered sockets 29, while the caps at the other ends of the rollers are formed with cylindrical sockets 30.

For detachable engagement with the angular tapered sockets 29, short roller-driving shafts 31 are formed with angular tapered ends 32. These shafts 31 are extended through bearing sleeves 33, flanges of which are bolted or otherwise rigidly secured to the adjacent head of the drum and project outward from the drum. Said shafts 31 are formed with annular grooves and the spaces between said shafts and the interiors of the sleeves 33 are filled with cast-in metal bushings 34 that are securely anchored within said sleeves.

For engagement with the cylindrical sockets 30, at the other ends of the rollers, I provide short shafts 35 that are loosely journaled therein and in the sleeve-like hubs 36 of disk-like port-closing covers 37. These covers 37 normally close roller ports or passages 38 that are alined with the rollers and are of such size that the rollers may be passed endwise therethrough to and from working positions within the drum. Preferably, and as shown, annular port-filling pieces 39 are secured to the inner faces of the port covers 37 and normally fill the ports 38. Nut-equipped bolts 40, applied through the outer portions of the port covers 37 and through the adjacent head of the drum, detachably hold said covers in working positions with liquid-tight joints between the same and the drum head.

Working with threaded engagement on the projecting hubs 36, of the port covers 37, are caps 41 that are adapted to be locked by set screws 42. The numeral 43 indicates set screws that work axially through the outer ends of the hubs 36, impinge against the outer ends of the roller shafts 35 and are provided with lock nuts 44.

When the rollers are applied in working positions, the set screws 43 should be tightened until the tapered angular sockets 29 are tightly engaged with the tapered angular shaft ends 32 and then said rollers will be connected for rotation with the sockets and will be held in true axial alinement therewith and all play or slack in the roller journals will be taken up. Moreover, the axial or endwise outward pressure on the roller-driving shafts 31 will press the collars, formed by the grooves thereof, into tight engagement with the intervening annular ribs of the bushings 34, thereby insuring liquid-tight joints and eliminating the necessity for other form of packing between the shaft and the bearings therefor.

At their outer ends, the roller-driving shafts 31 are provided with sprockets 45. A single sprocket chain 46 runs over two of the diametrically opposite sprockets 45 and against the inner surface of the other two diametrically opposite sprockets 45. One of the roller-driving shafts 31, outward of its sprocket 45, is provided with a sprocket 47, over which and the sprocket 14, on the drum of the driving shaft 13, runs a sprocket chain 49.

Figure 1:
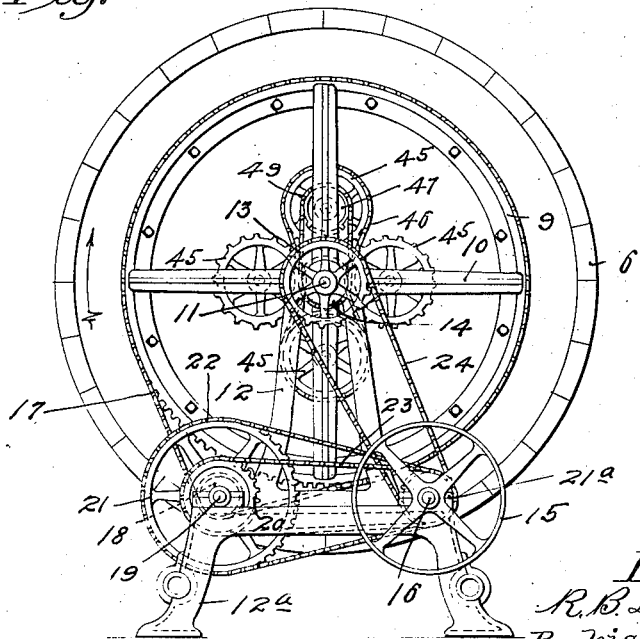
Figure 1 is an end elevation of the combined churn and butter worker to which the several features of my invention are applied.

By the driving connections now described, when the drum is rotated in the direction of the arrow marked in Figs. 1 and 2, the four butter-working rollers 27 will be rotated in the direction of arrows marked thereon in Fig. 2. Note that two of the diametrically opposite rollers are driven in the same direction and in the direction of the rotation of the drum, while the other two diametrically opposite rollers are driven in the opposite direction. This manner of driving the rollers will cause the butter to be worked four times by the rollers for each complete rotation of the drum. Of course, the flights 26 deliver the butter to the rollers on the rising side of the drum.

The placing of one pair of rollers closer to the axis of the drum than the other pair accomplishes several results, to wit: it gives more hopper room for the large body of butter on the rising side of the drum, because it sets the rollers, that are adjacent to the butter, a little nearer toward straight alinement. This is especially important in large size drums. Also, with the arrangement of driving sprockets and chains shown, the placing of the rollers having the sprockets, against the inner or adjacent portions of which the chain 46 is arranged to run, increases considerably the circumferential extent of the contact between said sprockets and chains, and thus improves the driving action.

The means for supporting and driving the rollers illustrated and described makes it an easy matter to apply or remove rollers and provides the best kind of supports therefor. The slack between the rollers and driving connections may always be taken up to compensate for wear or inaccuracy in construction. The loose shafts 35 are free to rotate in the hubs 36 and the roller sockets 30 are free to rotate on said shafts. Whether the shafts 35 will rotate or remain stationary in the hubs 36 depends upon whether the friction is greater between said shafts and sockets 30 or between said shafts and the hubs 36 and set screws 43. The adjustments of the shaft 39 by the set screws 43 permits the rollers always to be held tight on their two shafts so that they will not wobble or sway from their proper axis of rotation.

It will, of course, be understood that the roller-supporting and driving connections just described are not limited to any particular type of churn or butter worker, but may be applied generally and are capable of modification, all within the scope of the invention herein disclosed.

What I claim is:

1. The combination with a drum arranged to rotate on an approximately horizontal axis, of diametrically opposite lifting flights within said drum, a group of four working rollers arranged in diametrically opposite pairs around the axis of said drum, and roller shafts extended through one drum head and combined with means for rotating one of said pairs of rollers in the same direction as the drum and the other pair of rollers in the opposite direction, one of said rollers being nearer to the axis of said drum than the other pair of rollers.

2. The combination with a drum arranged to rotate on an approximately horizontal axis, of diametrically opposite lifting flights within said drum, a group of four working rollers arranged in diametrically opposite pairs around the axis of said drum, roller shafts extended through one drum head and provided with sprockets at their outer ends, means for rotating one of the roller shafts, and a sprocket chain running over two diametrically opposite sprockets and against the inner portions of the other two sprockets, said latter noted sprockets and the rollers to which they are connected being nearer to the axis of the drum than the other two sprockets and the rollers to which they are connected.

3. The combination with a drum arranged to rotate on an approximately horizontal axis, of diametrically opposite lifting flights within said drum, a group of four working rollers arranged in diametrically opposite pairs around the axis of said drum, and roller shafts extended through one drum head and combined with means for rotating one of said pairs of rollers in the same direction as the drum and the other pair of rollers in the opposite direction, one of said rollers being nearer to the axis of said drum than the other pair of rollers, said drum having diametrically opposite lifting shelves arranged to deliver directly toward the rollers that are farthest from the axis of the drum.

4. The combination with a rotary drum and working rollers therein, one of the drum heads having roller entrance ports alined, one with each roller, independently displaceable port covers normally closing said ports, axially adjustable shafts mounted in said port covers and seated in the adjacent ends of the respective rollers, and roller-driving shafts extended through the other drum head and detachably connected to the respective rollers for driving the same.

5. The combination with a rotary drum and working rollers therein, of roller entrance ports in one of the drum heads, displaceable port covers normally closing said ports and provided with sleeve-like hubs, axially adjustable shafts mounted in said sleeve-like hubs and engageable with sockets in the adjacent ends of said rollers, set screws in the ends of said hubs for adjusting said shafts, by pressing against the outer ends thereof angular sockets applied to the other ends of said rollers, roller-driving shafts extended through the other drum head and provided with angular inner ends engageable with the angular seats of said rollers, bearing sleeves applied to the latter noted drum head and in which said driving shafts are journaled, said driving shafts being peripherally grooved, and means connected to the outer ends of said driving shafts for rotating said rollers.

6. The combination with a rotary drum and working rollers working therein, of roller entrance ports in one of the drum heads, displaceable port covers normally closing said ports and provided with sleeve-like hubs, loose axially adjustable shafts mounted in said hubs and engageable with sockets in the adjacent ends of said rollers, set screws in the ends of said hubs for adjusting said shafts, by pressing against the outer ends thereof tapered angular sockets applied to the other ends of said rollers, roller-driving shafts extended through and journaled in the other drum head and having tapered angular inner ends for engagement with the tapered angular sockets of said rollers, and means connected to the outer ends of said roller-driving shafts for rotating said rollers.

7. The combination with a rotary drum and working rollers working therein, of roller entrance ports in one of the drum heads, displaceable port covers normally closing said ports and provided with sleeve-like hubs, loose axially adjustable shafts mounted in said hubs and engageable with sockets in the adjacent ends of said rollers, set screws in the ends of said hubs for adjusting said shafts, by pressing against the outer ends thereof caps detachably applied to the ends of said hubs to inclose said set screws, tapered angular sockets applied to the other ends of said rollers, roller-driving shafts extended through and journaled in the other drum head and having tapered angular inner ends for engagement with the tapered angular sockets of said rollers, and means connected to the outer ends of said roller-driving shafts for rotating said rollers.

In testimony whereof I affix my signature.

REUBEN B. DISBROW.

In presence of—
F. W. SAWYER,
G. LOCKE.